US011844360B1

(12) United States Patent
Tavares Gunsagar

(10) Patent No.: US 11,844,360 B1
(45) Date of Patent: Dec. 19, 2023

(54) GHEE PRODUCTS AND METHODS OF MAKING THE SAME

(71) Applicant: Tava Organics, LTD, Venice, CA (US)

(72) Inventor: Raquel Tavares Gunsagar, Pacific Palisades, CA (US)

(73) Assignee: Tava Organics, LTD, Venice, CA (US)

( * ) Notice: Subject to any disclaimer, the term of this patent is extended or adjusted under 35 U.S.C. 154(b) by 61 days.

(21) Appl. No.: 16/746,368

(22) Filed: Jan. 17, 2020

Related U.S. Application Data

(60) Provisional application No. 62/802,815, filed on Feb. 8, 2019, provisional application No. 62/794,162, filed on Jan. 18, 2019, provisional application No. 62/794,290, filed on Jan. 18, 2019.

(51) Int. Cl.
*A23C 17/00* (2006.01)
*A23D 9/04* (2006.01)

(52) U.S. Cl.
CPC ..................... *A23D 9/04* (2013.01)

(58) Field of Classification Search
CPC ....................................................... A23D 9/04
USPC ........................................................ 426/607
See application file for complete search history.

(56) References Cited

U.S. PATENT DOCUMENTS

2010/0196534 A1* 8/2010 Illingworth ............ A23D 9/007
426/43

FOREIGN PATENT DOCUMENTS

EP            2493327 B1 *  2/2017  ........... A23D 7/0053
KR    20170142087 A  *  12/2017

OTHER PUBLICATIONS

Illingworth D., Bissell T.G. (1994) Anhydrous Milkfat Products and Applications in Recombination. In: Moran D.P.J., Rajah K.K. (eds) Fats in Food Products. Springer, Boston, MA. https://doi.org/10.1007/978-1-4615-2121-1_4. (Year: 1994).*
Translation of KR-20170142087-A (Year: 2017).*

* cited by examiner

*Primary Examiner* — Brent T O'Hern
(74) *Attorney, Agent, or Firm* — DLA Piper LLP (US)

(57) ABSTRACT

Provided herein are sprayable ghee compositions comprising ghee and one or more additional oils such as coconut oil, avocado oil, sunflower oil, palm oil, or grapeseed oil.

3 Claims, 1 Drawing Sheet

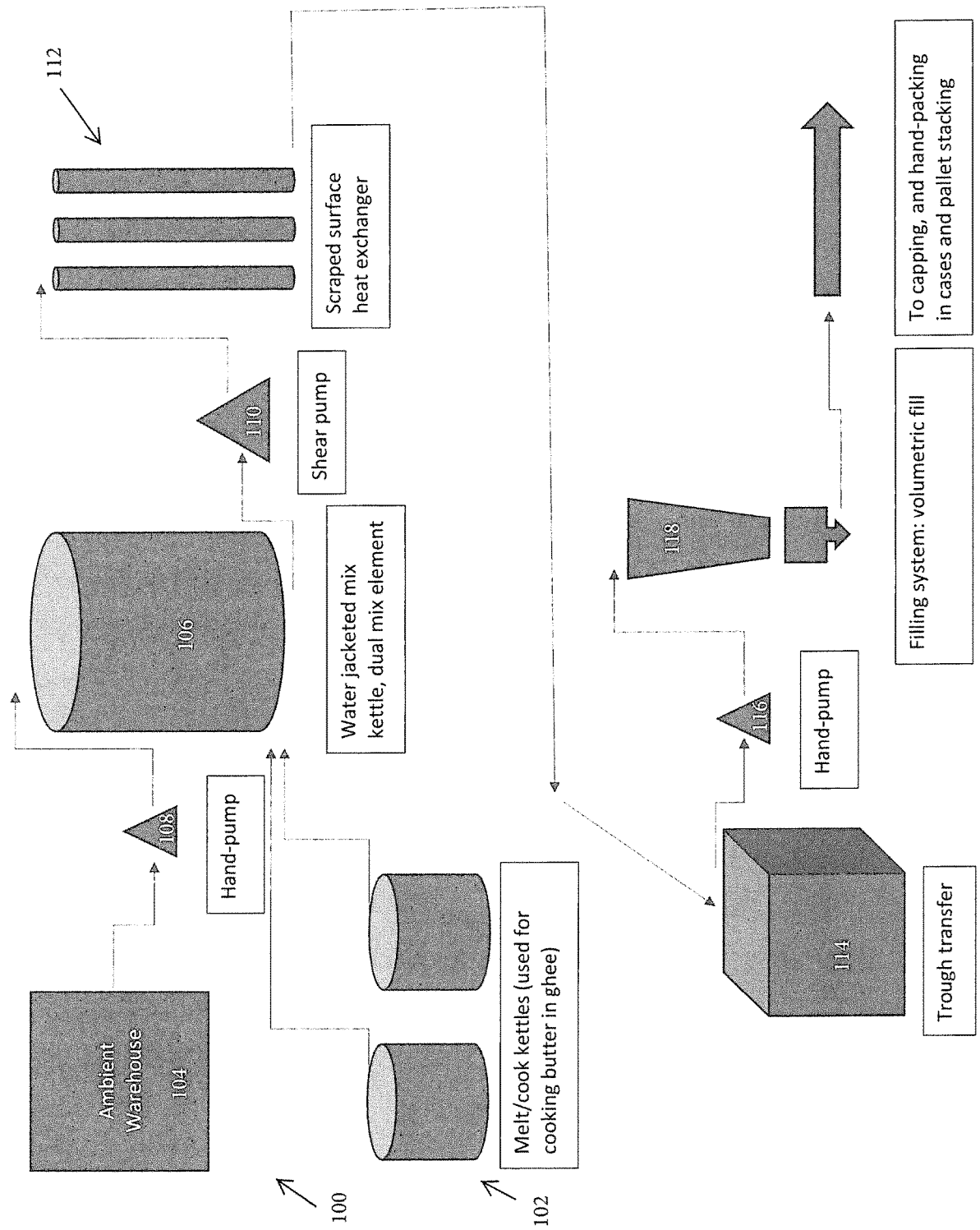

GHEE PRODUCTS AND METHODS OF MAKING THE SAME

CROSS-REFERENCE TO RELATED APPLICATIONS

The present disclosure claims priority to U.S. Provisional Application Nos. 62/794,162 and 62/794,290 entitled "Improved Ghee Products and Methods of Making the Same," both of which were filed on Jan. 18, 2019, and also claims priority to U.S. Provisional Application Nos. 62/802,815 entitled "Improved Ghee Products and Methods of Making the Same," filed on Feb. 8, 2019. All applications, including U.S. Provisional Application No. 62/655,452 entitled "Ghee Based Creamer," filed on Apr. 10, 2018, are incorporated by reference herein in their entirety.

TECHNICAL FIELD

Embodiments of the present disclosure relate to compositions and methods of making ghee-based products, and more particularly to the preparation of sprayable and/or pourable natural oil blends that are stable at room temperature, during and/or post-refrigeration.

BACKGROUND OF THE INVENTION

Ghee is a superfood alternative to other everyday butter, butter alternatives, and cooking oils. Made by simply cooking and filtering butter, it becomes a lactose free, shelf-stable butter. Ghee is a desirable choice as a butter or oil substitute for a variety of reasons including its practical availability for high heat cooking, flavor, shelf-stability and health benefits. Though having been utlized for centuries, only recently have the benefits of ghee been scientifically documented. For example, ghee contains a high content of naturally occurring fatty acids and CLA (conjugated linoleic acid), which can improve gut health and biochemistry. CLA is also important for weight loss and for skin health. Ghee contains high levels of omega-6 fatty acids and omega-3 fatty acids which is good for overall health and especially brain health. Ghee is a natural source of butyric acid (a short-chain fatty acid that nourishes the cells of the intestines) which facilitates and improves the absorption of nutrients from food that is consumed.

Although ghee is high in saturated fats, it is ideal for many types of cooking because it has a high smoke point (i.e., it does not burn very easily). This means, it generates fewer free radicals when heated, which are known to increase the risk of cancer. It is also rich in antioxidants that in turn protect free radical damage.

Ghee is known to be a good beauty enhancer as well: from application to chapped lips to incorporation in beauty face masks. According to Ayurvedic practices, ghee is used in a large variety of ways: as a moisturizing agent combined with water, as a paste combined with additives ranging from rosewater to turmeric.

Whereas butter is a composition consisting of milk solids, butter fat and water, ghee is essentially butter minus milk solids and water. Ghee is considered to be a higher dose of good fat found in butter. Ghee is essentially all of the best parts of butter without lactose and allergens such as casein. The process of simmering the butter and filtering out the sediments and milk solids removes a significant percentage of lactose and casein, meaning that individuals who are lactose and casein intolerant/sensitive can often eat ghee without any digestive or allergic consequences.

One drawback of ghee made by traditional recipes is that it is not always sprayable, pourable, or readily spreadable. Oftentimes, it is solid or semi-solid making it not conveniently available for certain uses. What is needed is a method for making ghee such that the resulting ghee is sprayable, pourable and otherwise easily useable while at the same time retaining its positive attributes such as flavor, fatty acid profile, and functionality for high heat cooking.

SUMMARY OF THE INVENTION

In an embodiment, the present disclosure relates to compositions comprising ghee, ghee-based products and methods for making the same. In an embodiment, the methods disclosed herein enable the production of ghee-based products that can be stored such that they remain stable at varying temperatures without fats settling out of the solution and/or undergoing phase separation during storage. The disclosure presented herein can be utilized to prepare sprayable, and/or pourable oil blends that can be used for a variety of purposes, including for example, cooking, remedies for a variety of ailments, and beauty or cosmetic applications. In an embodiment, the ghee-based products described herein are natural, organic and do not contain preservatives, stabilizers, binders, fillers, or water. In an embodiment, the ghee-based products described herein are stable at room temperature and/or during and post-refrigeration for an extended period (e.g., at least about 5-150 days) without experiencing phase separation between the solid and liquid phase, clogged nozzles when discharged from containers, and unwanted settling of solid fat out of the solution.

Certain embodiments described herein include ghee-based products comprising ghee derived from butter. Certain embodiments further comprise additional ingredients such as oils, including but not limited to: avocado, sesame, canola, peanut, corn, safflower, sunflower, rapeseed, grapeseed, olive, extra virgin olive, flax, almond, coconut, peanut, cashew, walnut, pecan, nut, palm, cottonseed, soybean, cannabidiol, met, hemp seed, brazil and argan.

Certain embodiments described herein include sprayable ghee-based products consisting essentially of canola oil, buttermilk, butter (cream, salt), cream, milk, plant-based milk, palm oil, salt, mono and diglycerides, lactic acid, potassium sorbate optionally combined with one or more natural flavors, and optionally combined with propellant agents that enable the ghee to be sprayable. In certain embodiments, ingredients that prevent clogging of nozzles may also be included.

Certain embodiments further comprise additional ingredients such as spices, including but not limited to: cardamom, star anise, cinnamon, peppercorns, turmeric, cumin, coriander, paprika, nutmeg, fennel, sesame, saffron, poppy seeds, nigella seeds, mustard seeds, mace, kalpasi, salt, black salt, Himalayan salt, pink salt, ginger powder, fenugreek seeds, cloves, chia seeds, carom seeds, celery seeds, asafetida, pomegranate seeds, dry mango powder, chipotle and allspice.

Certain embodiments further comprise additional ingredients such as herbs, including but not limited to: garlic, parsley, thyme, coriander, basil, fenugreek, mint, ginger powder, dill, curry leaves, bay leaves, oregano, marjoram, and rosemary.

Certain embodiments further comprise additional ingredients such as flavorings, including but not limited to: citrus, vanilla, chocolate, chilli, and honey.

The ghee-based products described herein may be stored at room temperature or they may be refrigerated.

The ghee-based products described herein may be available in a sprayable, pourable, scooping or spooning format.

BRIEF DESCRIPTION OF DRAWINGS

This disclosure will be more fully understood from the following detailed description taken in conjunction with the accompanying drawing, in which:

FIG. 1 is a schematic representation of a process of making ghee-based product according to the methods claimed herein.

DETAILED DESCRIPTION

The following detailed description is exemplary and explanatory and is intended to provide further explanation of the present disclosure described herein. Other advantages, and novel features will be readily apparent to those skilled in the art from the following detailed description of the present disclosure.

The present disclosure relates to compositions and methods of making ghee-based products, and more particularly relates to a sprayable and/or pourable oil blends that are stable at room temperature and/or during and post-refrigeration. The oil blends may be made from all-natural ingredients, without preservatives, stabilizers, binders, fillers, or water, that, when mixed in the amounts specified herein, and passed through the process described herein, can remain stable at varying temperatures without experiencing unwanted phase separation between its solid and liquid phases. The oil blends, as described herein, pertain to one or more of a ghee oil cooking spray and/or pourable cooking oil, though it will be appreciated that a person skilled in the art, in view of the present disclosure, will be able to modify and/or adapt the techniques and compositions provided for herein to make other compositions of matter, such as butter used in making other types of products, such as margarines, creamers, spreads and the like. Further, a person skilled in the art, in view of the present disclosures, will understand that the oil blends may also be adapted into spreadable oil, among other non-limiting examples.

Process of Preparation

FIG. 1 illustrates an exemplary embodiment of a process 100 for preparing the ghee-based product, i.e. the oil blend as claimed herein. To the extent the FIGURE includes various components, these components are illustrated schematically. A person skilled in the art will recognize many different suitable components that can be used for such schematic representations. For example, kettle 102 is illustrated, and a person skilled in the art will recognize many suitable vessels can be used in conjunction with the methods and processes described herein.

The ingredients of the oil blend may vary. For example, the oil blend can include a single oil, a single oil mixed with additional ingredients, two or more oils mixed together in solution, and so forth. One having ordinary skill in the art will appreciate that the type of ingredients mixed, as well as the nature of the ingredients, can impact certain characteristics of the resulting compound, e.g., stability, phase separation, and so forth. Further, it will be appreciated that although the present composition and processes disclosed herein are discussed with respect to the preparation of a three-oil blend, the composition and the processes can be adapted to include fewer or greater number of oils, additional ingredients, or applied to the preparation of other compounds, e.g., margarine, butter, and so forth. Moreover, while the process can be substantially similar for the preparation of pourable cooking oil and cooking spray, differences in the preparation process for the two formats will be highlighted in the disclosure herein. In certain alternative embodiments, the oil blend may comprise additional ingredients, including but not limited to spices, herbs, and flavors.

Referring to FIG. 1, the oil blend can be prepared in one or more melt or cook kettles 102. The kettles 102 can be used to store, heat, cool, and/or mix one or more of the ingredients of the oil blend therein. The kettles 102 can be configured to be heated and/or cooled as desired to ensure appropriate heating and cooling, as well as mixing, of ingredients at preset temperatures. It will be appreciated that, in some embodiments, the kettle 102 can be held at an ambient temperature, such as in an ambient warehouse 104, though the kettles can be stored at temperatures above or below ambient temperature. Further, as shown, multiple kettles 102 can be used in the process 100 to enable heating of each oil to a unique temperature or to allow mixing of oils at preset temperatures. In an embodiment, Anhydrous Milk Fat (AMF)/Ghee Blend is combined with one or more oils according to a predetermined recipe and predetermined procedure resulting in the novel ghee-based product, i.e. novel oil blend as claimed. For example, Anhydrous Milk Fat (AMF)/Ghee Blend may be added to the kettle 102 having additional oils, such as coconut oil and/or avocado oil mixed therein to mix the oils to form a blend, though it will be appreciated that, in some embodiments, the avocado oil can be mixed with the AMF/Ghee blend prior to the coconut oil being added thereto, and/or the coconut oil can be mixed with the AMF/Ghee blend prior to the avocado oil being added thereto.

In an embodiment, as provided for herein, a ghee-based product as claimed herein may be prepared by the process 100 described herein and comprises a three-oil blend that includes an Anhydrous Milk Fat (AMF)/Ghee Blend, coconut oil, and avocado oil. One having ordinary skill in the art will appreciate that additional oils, e.g., palm oil, sunflower oil, grapeseed oil, etc., may be used in lieu of, or in addition to, the oils in the oil blend. Many different oil combinations are possible.

In an embodiment, a sprayable ghee-based product as presently described and claimed may be prepared by the process 100 described herein wherein the ingredients may be selected from the group comprising, but not limited to, canola oil, buttermilk, butter (cream, salt), cream, milk, plant-based milk, palm oil, salt, mono and diglycerides, lactic acid, potassium sorbate optionally combined with one or more natural flavors, and optionally combined with propellant agents that enable the ghee to be sprayable. In certain embodiments, ingredients that prevent clogging of nozzles may also be included. Sprayable ghee as described herein may be prepared by any processes apparent to those skilled in the art.

In some embodiments, additives such as emulsifiers are added to the ghee-based product. For example, lecithins, composed of glycerophospholipids may be suitable for use. Lecithins appropriate for use herein may be naturally occurring and extracted from sources such as sunflowers, soybeans, eggs, milk, rapeseed, cottonseed, and others. As contemplated herein, lecithins may also be synthetically or chemically manufactured according to processes known by those skilled in the art. In an embodiment, the ghee-based product of the invention comprises AMF/Ghee blend, one or more additional oils and further comprises sunflower lecithin.

In some embodiments, the AMF/Ghee blend portion of the composition approximately comprises an amount in the range of about 20% by weight to about 40% by weight, or approximately in the range of about 30% by weight to about 38%, 30% by weight to about 40% by weight, or approximately in the range of about 31.5% by weight to about 35% by weight, or approximately in the range of about 32% by weight to about 34% by weight, or approximately in the range of about 33% by weight to about 34% by weight, based on the total weight of the oil blend.

In some embodiments, an additional oil, i.e. a second oil, such as coconut oil, may be used in an amount approximately in the range of about 20% by weight to about 40% by weight, or approximately in the range of about 30% by weight to about 38% by weight, or approximately in the range of about 31.5% by weight to about 35% by weight, or approximately in the range of about 32% by weight to about 34% by weight, or approximately in the range of about 33% by weight to about 34% by weight, based on the total weight of the oil blend.

In some embodiments, an additional oil, i.e. a third oil, such as avocado oil may be used in an amount approximately in the range of about 20% by weight to about 40% by weight, or approximately in the range of about 30% by weight to about 38% by weight, or approximately in the range of about 31.5% by weight to about 35% by weight, or approximately in the range of about 32% by weight to about 34% by weight, or approximately in the range of about 33% by weight to about 34% by weight, based on the total weight of the oil blend.

The process of making the ghee-based products of the invention may comprise the addition of ingredients at varying temperatures. Though not wishing to be bound by the following theory, it is thought that by modifying the temperatures of the oils, the ability to properly mix the oils and the AMF/Ghee blend may be optimized. For example, in some embodiments, the AMF/Ghee blend can be heated to approximately 220 degrees Fahrenheit, and added to a mix of coconut oil and avocado oil at approximately 70-80 degrees Fahrenheit or about 76 degrees Fahrenheit, with the resulting solution being maintained at a temperature of approximately 110-140 degrees Fahrenheit, or about 130, 125 or 120 degrees Fahrenheit. It will be appreciated that the temperature of each of the oils can varied such that, mixing and blending is optimized.

Once the oils are sufficiently mixed, the solution may be transferred from the kettles 102 to a mix kettle 106. As shown, the solution may be transferred using a hand pump 108, though it will be appreciated that other devices known in the art to transfer compounds from one container to another can be used, e.g., a pressure differential pump. The mix kettle may complete the mix of the solution while heating and/or cooling the solution to a desired temperature. The mix kettle 106 can be water jacketed such that water can circulate therethrough to heat and/or cool the substances contained therein. In some embodiments, the mix kettle may contain a mix element (not shown) such as a dual mix element to mix the solution. The dual mix element may mix the contents of the mix kettle 106 to evenly distribute the oils throughout the solution to prepare a finished mix. The finished mix may exit and be recirculated back into the mix kettle 106 if the temperature of the finished mix is higher and/or lower than the desired temperature or temperature range. In some embodiments, the desired temperature of the finished mix may be approximately 130-180 degrees Fahrenheit or about 140 degrees Fahrenheit or approximately 160 degrees Fahrenheit, though it will be appreciated that the desired temperature can vary based on the contents of the finished mix. In case the temperature of the finished mix is lower than the desired temperature, the finished mix can be pumped back into the mix kettle 106 until the desired temperature is reached.

In certain embodiments, lecithin, such as sunflower lecithin may be added to the mix kettle 106 to be distributed throughout the solution. Various tools or instruments can be used to distribute the sunflower lecithin throughout the solution. For example, an agitator can be used for such purposes. The sunflower lecithin can be added at any point during the mixing of the finished mix in the mix kettle, though one having ordinary skill in the art will appreciate that it can be added for about 2 minutes, about 5 minutes, or about 10 minutes prior to recirculation of the heated mix into the mix kettle 106 to allow the lecithin to distribute uniformly throughout the finished mix.

In certain embodiments, sunflower lecithin may be used in an amount approximately in the range of about 0.5% by weight to about 5% by weight, about 0.6% by weight to about 0.9% by weight, about 0.7% by weight to about 0.8% by weight, about 0.72% by weight to about 0.76% by weight, or about 0.73% by weight to about 1.5% by weight, based on the total weight of the oil blend.

The finished mix may exit the mix kettle 106 via a shear pump 110 to be passed to a heat exchanger 112. The shear pump 110 can be configured to collect varying percentages of the finished mix. For example, in some embodiments, the shear pump 110 can collect approximately 50% of finished mix, approximately 65% of finished mix, approximately 70% of the finished mix, approximately 85% of the finished mix, or approximately 100% of the finished mix.

The finished mix may undergo a cooling process within the heat exchanger 112. The heat exchanger may be a scraped surface heat exchanger. The heat exchanger 112 may include multiple columns to allow gradual cooling of the finished mix as it flows therethrough. The chamber of the heat exchanger 112 can be attached to a cooling component, such as glycol, which can cool the finished mix as it passes therethrough.

As shown, the heat exchanger 112 may include three chambers, though it will be appreciated that, in some embodiments, the heat exchanger may include a single column, two columns, or four or more columns. In certain embodiments, the heat exchanger may comprise a single horizontal unit with the optional additional horizontal units that may be added above or below. Use of multiple chambers allows gradual cooling of substances, e.g., the finished mix, that passes therethrough. For example, each chamber of the heat exchanger 112 may be set to an incrementally lower temperature to cool the finished mix as it passes therethrough. Gradual cooling of the finished mix in the heat exchanger produces efficient binding of the fats in the finished mix, which contributes to the stability of the resulting oil blend. Moreover, gradual cooling can decrease the likelihood of phase separation, e.g., formation of distinct solid/liquid layers, in the oil blend. Exemplary values for temperatures in the chambers may vary depending on the recipe and may range from 0 to 250 degrees Fahrenheit. It will be appreciated that the final chamber may be set at a temperature at which it is desired for the finished mix to exit the system. Further, in some embodiments, sunflower lecithin may be added to the finished mix while the finished mix passes through the heat exchanger.

Once the finished mix exits heat exchanger 112, it passes to a trough 114.

The oil blend exits the trough 114 via a hand pump 116 into a filling system 118. The pump 118 can be configured to collect varying percentages of the finished mix to be passed to the filling system. For example, in some embodiments, the shear pump 110 can collect approximately 10% of finished mix, approximately 25% of finished mix, approximately 45% of the finished mix, approximately 75% of the finished mix, or approximately 100% of the finished mix. The filling system 118 can be a dispenser that collects and/or stores the oil blend for depositing into containers. For example, the filling system can be a container having a spigot that can fill bottles with cooking oil and spray containers with cooking spray. Once filled, the bottles and spray containers can be sent to a location for capping, hand-packing into cases, pallet stacking, and shipping to stores. In certain embodiments, the mix is filled into bag-on-valve apparati. It will be appreciated that the oil blend can be stored in either ambient or refrigerated conditions.

Certain embodiments further comprise additional ingredients added to the finished mix to add flavor to the resulting oil blend such as spices, including but not limited to: cardamom, star anise, cinnamon, peppercorns, turmeric, cumin, coriander, paprika, nutmeg, fennel, sesame, saffron, poppy seeds, nigella seeds, mustard seeds, mace, kalpasi, salt, black salt, Himalayan salt, pink salt, ginger powder, fenugreek, cloves, chia seeds, carom seeds, celery seeds, asafetida, pomegranate seeds, and dry mango powder.

Certain embodiments further comprise additional ingredients such as herbs, including but not limited to: garlic, parsley, thyme, coriander, basil, fenugreek, mint, ginger powder, dill, curry leaves, bay leaves, oregano, marjoram, rosemary, chipotle and allspice.

Certain embodiments further comprise additional ingredients such as flavorings, including but not limited to: citrus, vanilla, chocolate, chilli, truffles, and honey.

Sprayable ghee may be made by the processes described above, or may be made by other processes known to those skilled in the art. Though not wishing to be bound by theory, sprayable ghee comprising ingredients selected from the group consisting of canola oil, buttermilk, butter (cream, salt), cream, milk, plant-based milk, palm oil, salt, mono and diglycerides, lactic acid, potassium sorbate optionally combined with one or more natural flavors, and optionally combined with propellant agents results in a ghee composition that is suitable for spraying. In certain embodiments, ingredients that prevent clogging of nozzles and spray mechanisms may also be included. As contemplated herein, the term 'sprayable' comprises a composition that may be distributed using a traditional spray canister or bottle, wherein the composition is sprayed via an aerosol or other propulsion mechanism (including for example propelling agents). The ghee that emerges from the spray mechanism may be in the form of mist, vapor, droplets and the like.

The illustrated and described composition and methods are in no way limiting. A person skilled in the art, in view of the present disclosure, will understand how to apply the teachings of one embodiment to other embodiments either explicitly or implicitly provided for in the present disclosure. Further, a person skilled in the art will appreciate further features and advantages of the present disclosure based on the above-described embodiments. Accordingly, the disclosure is not to be limited by what has been particularly described, except as indicated by the appended claims. All publications and references cited herein are expressly incorporated herein by reference in their entirety.

EXAMPLES

Examples are provided below to facilitate a more complete understanding of the invention. The following examples illustrate the exemplary modes of making and practicing the invention. However, the scope of the invention is not limited to specific embodiments disclosed in these Examples, which are illustrative only, since alternative methods can be utilized to obtain similar results.

Provided below are various compositions of multiple oil blends comprising ghee. The descriptions include select non-limiting examples of compositions formed using the methods described above, as well information about testing the various compositions of liquid ghee. This information includes, but is not limited to, how the liquid ghee was formulated, how it was tested, and results from such testing. A person skilled in the art, in view of the present disclosures, will understand how to apply the various disclosures related to the testing into formulations of ghee butter and into methods of making ghee butter.

In an embodiment, AMF/Ghee at approximately 200° F. was added to coconut oil and avocado oil (both at approximately 76° F.). The complete mixture was recycled back into heating kettle and the temperature was raised to approximately 160° F. Sunflower lecithin was added and mixed using an agitator for 5 minutes before recirculation.

In an embodiment, AMF/Ghee was (30-35%) was combined with grapeseed oil (30-35%), avocado oil (30-35%) and sunflower lecithin (0.5-5%) in accordance with the methods described herein and shown generally in FIG. 1. The resulting oil was free of crystallized fat, had the aroma of butter and the tasted included toasted or nutty notes. The oil was homogenous (no separation between oils).

In an embodiment, AMF/Ghee was (30-35%) was combined with grapeseed oil (30-35%), avocado oil (30-35%), sunflower lecithin (0.5-5%), and roasted garlic extract (0.5-5%) in accordance with the methods described herein and shown generally in FIG. 1. The resulting oil was free of crystallized fat, lacked acrid or burnt notes and did not have a bitter taste. The oil was homogenous (no separation between oils), and had the aroma of roasted garlic.

In an embodiment, AMF/Ghee was (30-35%) was combined with grapeseed oil (30-35%), avocado oil (30-35%), sunflower lecithin (0.5-5%), and black truffle oil (0.1-5%) in accordance with the methods described herein and shown generally in FIG. 1. The resulting oil was free of crystallized fat, lacked sulfurous notes and did not have a bitter taste. The oil was homogenous (no separation between oils), and had the aroma of truffles.

In an embodiment, AMF/Ghee was (20-80%) was combined with butter (15-50%) grapeseed oil (25-40%), avocado oil (25-40%), sunflower lecithin (0.2-5%), in accordance with the methods described herein and shown generally in FIG. 1. The resulting oil was uniform and yellow in appearance and did not clump. The oil did not have high viscosity and flowed readily.

The above examples of oil blends maybe packaged in bottles for dispensing via spray mechanisms according to methods known by those skilled in the art.

The invention claimed is:

1. A method of preparing an oil blend, the method comprising:
   combining about 30% by weight to about 40% by weight of a first oil, wherein the first oil is an Anhydrous Milk Fat/Ghee blend, with about 30% by weight to about 40% by weight of a second oil, and about 30% by weight to about 40% by weight of a third oil to form a composition,
   heating the composition in a mix kettle while mixing the composition in the mix kettle to form a finished mix;

recirculating the finished mix through the mix kettle until the finished mix reaches a predetermined temperature; and passing the finished mix through a heat exchanger to cool the finished mix, forming the oil blend;

wherein the second oil is a coconut oil or avocado oil, and the third oil is sunflower oil, palm oil, or grapeseed oil.

2. The method of claim 1, wherein the heating the composition in the mix kettle while mixing further comprises raising a temperature of the composition to a predetermined temperature.

3. The method of claim 1, further comprising adding from about 0.5% by weight to about 5% by weight of a sunflower lecithin to the mix kettle, wherein the weight is based on a total weight of the composition, wherein the total weight of the composition includes the weight of the sunflower lecithin.

* * * * *